(12) United States Patent
Akkarakaran et al.

(10) Patent No.: US 11,706,731 B2
(45) Date of Patent: Jul. 18, 2023

(54) DIFFERENTIAL ROUND TRIP TIME BASED POSITIONING

(71) Applicant: QUALCOMM Incorporated, San Diego, CA (US)

(72) Inventors: Sony Akkarakaran, Poway, CA (US); Taesang Yoo, San Diego, CA (US); Joseph Binamira Soriaga, San Diego, CA (US); Tao Luo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/566,513

(22) Filed: Dec. 30, 2021

(65) Prior Publication Data

US 2022/0124653 A1 Apr. 21, 2022

Related U.S. Application Data

(62) Division of application No. 16/717,794, filed on Dec. 17, 2019, now Pat. No. 11,304,169.

(30) Foreign Application Priority Data

Dec. 19, 2018 (GR) ............................... 20180100562

(51) Int. Cl.
*H04W 56/00* (2009.01)
*H04W 88/08* (2009.01)
(Continued)

(52) U.S. Cl.
CPC ......... *H04W 56/009* (2013.01); *H04L 5/0051* (2013.01); *H04W 8/24* (2013.01);
(Continued)

(58) Field of Classification Search
CPC ... G01S 13/751; H04L 5/0051; H04L 5/0053; H04W 24/08; H04W 24/10; H04W 64/00; H04W 8/24; H04W 88/085
See application file for complete search history.

(56) References Cited

U.S. PATENT DOCUMENTS 9,277,369 B2 * 3/2016 Lindskog ................ G01S 5/021
2002/0094820 A1 * 7/2002 Keranen ................... G01S 5/14
342/450
(Continued)

FOREIGN PATENT DOCUMENTS

TW 200931054 A 7/2009

OTHER PUBLICATIONS

International Search Report and Written Opinion—PCT/US2019/067192—ISA/EPO—dated Jun. 30, 2020.
(Continued)

*Primary Examiner* — Stephen J Clawson
(74) *Attorney, Agent, or Firm* — MG-IP Law, P.C.

(57) ABSTRACT

Disclosed are techniques for determining a position of a user equipment (UE). A differential round-trip-time (RTT) based positioning procedure is proposed to determine the UE position. In this technique, the UE position is determined based on the differences of the RTTs between the UE and a plurality of base stations. The differential RTT based positioning procedure has much looser inter-gNodeB timing synchronization requirements than the OTDOA technique and also has much looser group delay requirements than traditional RTT procedures.

29 Claims, 11 Drawing Sheets

(51) Int. Cl.
  *H04L 5/00* (2006.01)
  *H04W 8/24* (2009.01)
  *H04W 24/10* (2009.01)
(52) U.S. Cl.
  CPC ......... *H04W 24/10* (2013.01); *H04W 56/002* (2013.01); *H04W 56/006* (2013.01); *H04W 88/085* (2013.01)

(56) References Cited

U.S. PATENT DOCUMENTS

| | | | |
|---|---|---|---|
| 2002/0129161 A1* | 9/2002 | Lloyd | H04L 43/0864 709/218 |
| 2007/0279281 A1* | 12/2007 | Oda | H04W 64/00 342/450 |
| 2011/0039583 A1 | 2/2011 | Frank et al. | |
| 2011/0081933 A1 | 4/2011 | Suh et al. | |
| 2011/0143773 A1 | 6/2011 | Kangas et al. | |
| 2012/0040687 A1 | 2/2012 | Siomina et al. | |
| 2014/0073351 A1 | 3/2014 | Loetter | |
| 2014/0248901 A1 | 9/2014 | Johnsson et al. | |
| 2014/0256347 A1* | 9/2014 | Lakhzouri | H04W 4/02 455/456.1 |
| 2014/0302870 A1 | 10/2014 | Cui et al. | |
| 2015/0126217 A1* | 5/2015 | Do | H04W 4/33 455/456.1 |
| 2015/0330795 A1 | 11/2015 | Srinivasan et al. | |
| 2015/0382152 A1* | 12/2015 | Lindskog | H04W 64/00 455/456.2 |
| 2016/0205499 A1 | 7/2016 | Davydov et al. | |
| 2017/0289946 A1 | 10/2017 | Aldana | |
| 2018/0199224 A1 | 7/2018 | Li | |
| 2018/0292522 A1* | 10/2018 | Cavendish | H04L 9/3297 |
| 2018/0310127 A1 | 10/2018 | Xia et al. | |
| 2020/0205104 A1 | 6/2020 | Akkarakaran et al. | |
| 2021/0227487 A1 | 7/2021 | Hosoda et al. | |
| 2022/0053435 A1* | 2/2022 | King | H04B 17/14 |
| 2022/0201632 A1 | 6/2022 | Akkarakaran et al. | |

OTHER PUBLICATIONS

International Preliminary Report on Patentability—PCT/US2019/067192, The International Bureau of WIPO—Geneva, Switzerland, dated Jul. 1, 2021.

Partial International Search Report—PCT/US2019/067192—ISAEPO—dated May 6, 2020.

QUALCOMM Incorporated:"On gNB Requirements for NR Positioning",3GPP Draft,3GPP TSG-RAN WG4 Meeting #93, R4-1915183,3rd Generation Partnership Project(3GPP),Mobile Competence Centre,650, Route Des Lucioles,F-06921 Sophia-Antipolis Cedex,FR,vol. RAN WG4,No. Reno,NV,USA,Nov. 18, 2019-Nov. 22, 2019,Nov. 8, 2019 (Nov. 8, 2019),XP051819421,pp. 1-7,Retrieved from Internet:URL:https://ftp.3gpp.org/tsg_ran/WG4_Radio/TSGR4_93/Docs/R4-1915183.zip,R4-1915183-On gNB-requirements for NR positioning.docx,[retrieved Nov. 8, 2019],p. 5-p. 6.

Taiwan Search Report—TW108146515—TIPO—dated Mar. 6, 2023.

* cited by examiner

DIFFERENTIAL ROUND TRIP TIME BASED POSITIONING

CROSS-REFERENCE TO RELATED APPLICATIONS

The present Application for Patent is a Divisional of patent application Ser. No. 16/717,794 entitled "DIFFERENTIAL ROUND TRIP TIME BASED POSITIONING" filed Dec. 17, 2019, pending, which claims priority under 35 U.S.C. § 119 to Greek Patent Application No. 20180100562, entitled "DIFFERENTIAL ROUND TRIP TIME BASED POSITIONING" filed Dec. 19, 2018, each of which is assigned to the assignee hereof, and expressly incorporated herein by reference in its entirety.

TECHNICAL FIELD

Various aspects described herein generally relate to wireless communication systems, and more particularly, to differential round trip time (RTT) based positioning.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard, referred to as "New Radio" (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps).

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device can also be configured to report the time of arrival (ToA) of RF signals.

With OTDOA, when the mobile device reports the time difference of arrival (TDOA) between RF signals from two network nodes, the location of the mobile device is then known to lie on a hyperbola with the locations of the two network nodes as the foci. Measuring TDOAs between multiple pairs of network nodes allows for solving the for mobile device's position as intersections of the hyperbolas.

Round trip time (RTT) is another technique for determining a position of a mobile device. RTT is a two-way messaging technique (network node to mobile device and mobile device to network node), with both the mobile device and the network node reporting their receive-to-transmit (Rx-Tx) time differences to a positioning entity, such as a location server or location management function (LMF), that computes the mobile device's position. This allows for computing the back-and-forth flight time between the mobile device and the network node. The location of the mobile device is then known to lie on a circle (for two-dimensional positioning) or a sphere (for three-dimensional positioning) with a center at the network node's position. Reporting RTTs with multiple network nodes allows the positioning entity to solve for the mobile device's position as the intersection of the circles or spheres.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method performed by a network node is disclosed. The method comprises collecting a plurality of RTTs between a user equipment (UE) and a plurality of base stations (BSs). Each RTT of the plurality of RTTs is associated with a BS of the plurality of BSs. Also, each RTT represents a total flight time of an RTT signal back and forth between the UE and the associated BS. The method also comprises performing a differential RTT based positioning procedure to determine a position of the UE based on differences of the RTTs among the plurality of RTTs.

An exemplary method performed by a wireless device is disclosed. The method comprises providing one or more group delay parameters for the wireless device to a positioning entity. The one or more group delay parameters may comprise an RTT type parameter indicating whether RTTs reported by the wireless device are measured RTTs or actual RTTs. It may be determined that a group delay of the wireless device is included in the reported RTTs when the RTT type parameter indicates that the reported RTTs are measured RTTs.

An exemplary network node is disclosed. The network node comprises at least one transceiver, at least one memory component, and at least one processor. The at least one transceiver, the at least one memory component, and the at least one processor are configured to collect a plurality of RTTs between a UE and a plurality of BSs. Each RTT of the plurality of RTTs is associated with a BS of the plurality of BSs. Also, each RTT represents a total flight time of an RTT signal back and forth between the UE and the associated BS. The at least one transceiver, the at least one memory component, and the at least one processor are also configured to perform a differential RTT based positioning procedure to determine a position of the UE based on differences of the RTTs among the plurality of RTTs.

An exemplary wireless device is disclosed. The wireless node comprises at least one transceiver, at least one memory component, and at least one processor. The at least one transceiver, the at least one memory component, and the at least one processor are configured to provide one or more group delay parameters for the wireless device to a positioning entity. The one or more group delay parameters may comprise an RTT type parameter indicating whether RTTs reported by the wireless device are measured RTTs or actual RTTs. It may be determined that a group delay of the wireless device is included in the reported RTTs when the RTT type parameter indicates that the reported RTTs are measured RTTs.

Another exemplary network node is disclosed. The network node comprises means for collecting a plurality of RTTs between a UE and a plurality of BSs. Each RTT of the plurality of RTTs is associated with a BS of the plurality of BSs. Also, each RTT represents a total flight time of an RTT signal back and forth between the UE and the associated BS. The network node also comprises means for performing a differential RTT based positioning procedure to determine a position of the UE based on differences of the RTTs among the plurality of RTTs.

Another exemplary wireless device is disclosed. The wireless device comprises means for providing one or more group delay parameters for the wireless device to a positioning entity. The one or more group delay parameters may comprise an RTT type parameter indicating whether RTTs reported by the wireless device are measured RTTs or actual RTTs. It may be determined that a group delay of the wireless device is included in the reported RTTs when the RTT type parameter indicates that the reported RTTs are measured RTTs.

An exemplary non-transitory computer-readable medium storing computer-executable instructions for a network node is disclosed. The computer-executable instructions comprise one or more instructions causing the network node to collect a plurality of RTTs between a UE and a plurality of BSs. Each RTT of the plurality of RTTs is associated with a BS of the plurality of BSs. Also, each RTT represents a total flight time of an RTT signal back and forth between the UE and the associated BS. The computer-executable instructions also comprise one or more instructions causing the network node to perform a differential RTT based positioning procedure to determine a position of the UE based on differences of the RTTs among the plurality of RTTs.

An exemplary non-transitory computer-readable medium storing computer-executable instructions for a wireless device is disclosed. The computer-executable instructions comprise one or more instructions causing the wireless device to provide one or more group delay parameters for the wireless device to a positioning entity. The one or more group delay parameters may comprise an RTT type parameter indicating whether RTTs reported by the wireless device are measured RTTs or actual RTTs. It may be determined that a group delay of the wireless device is included in the reported RTTs when the RTT type parameter indicates that the reported RTTs are measured RTTs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
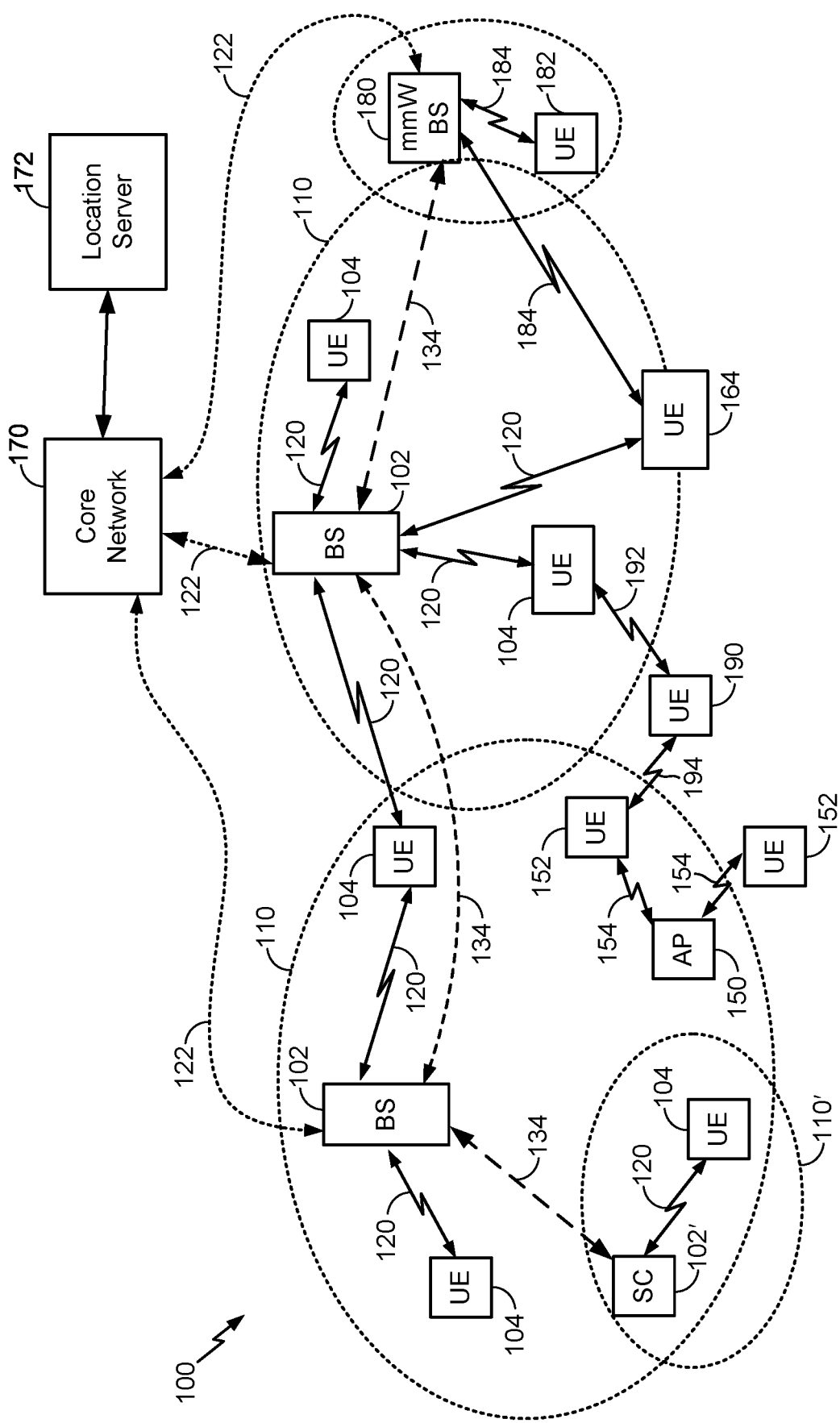
FIG. 1 illustrates a high-level system architecture of a wireless communications system in accordance with an aspect of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
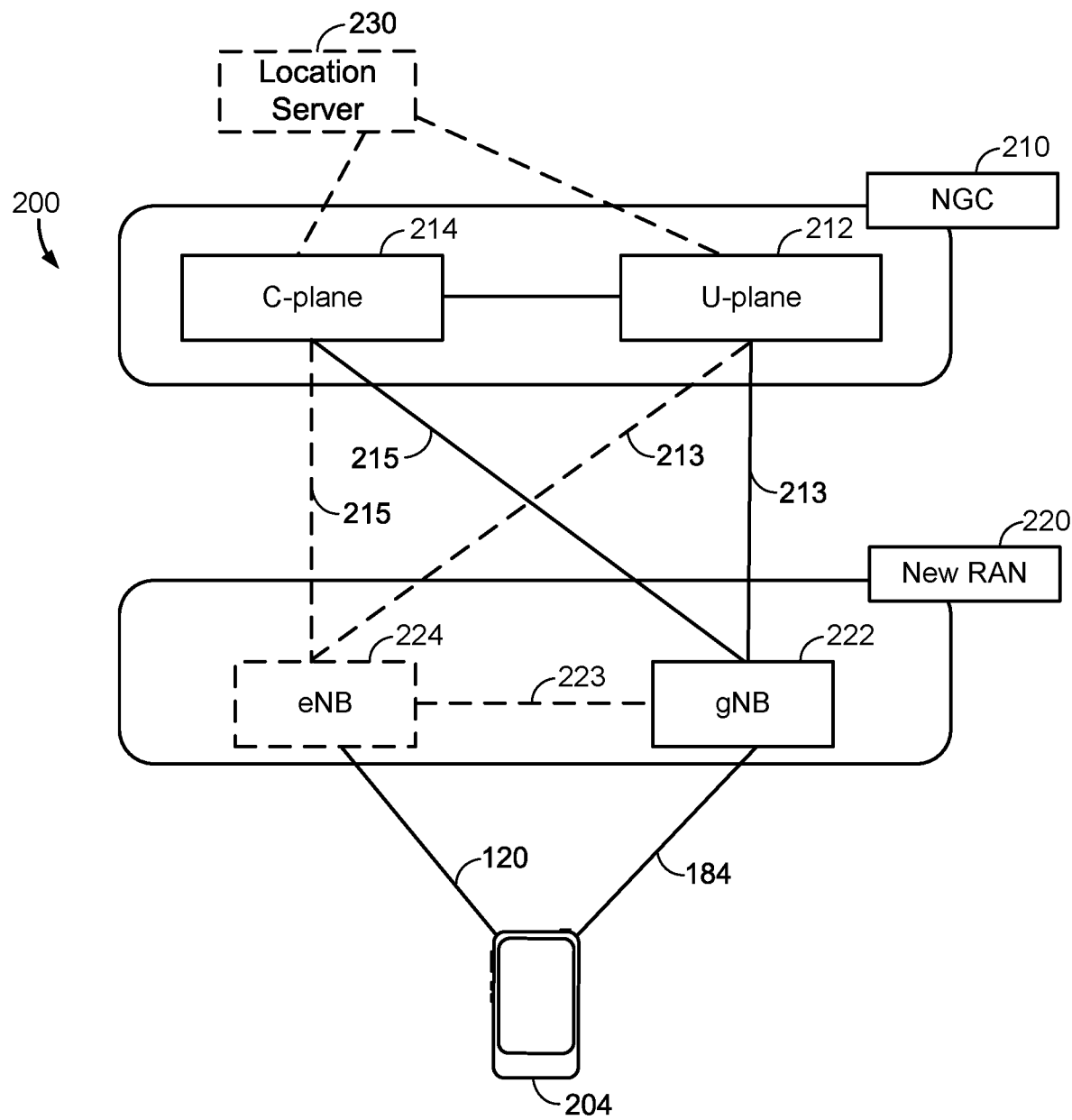
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
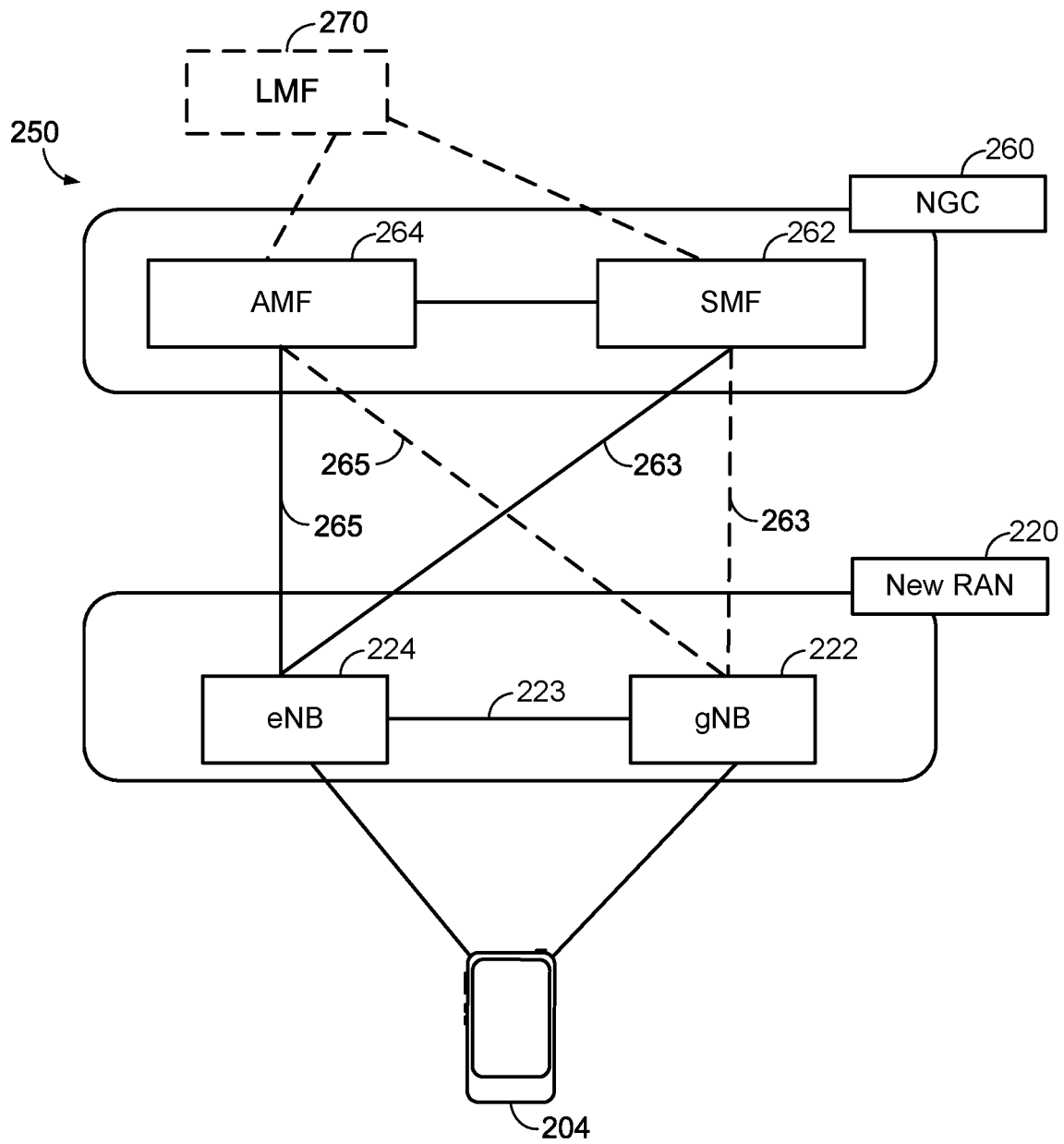

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
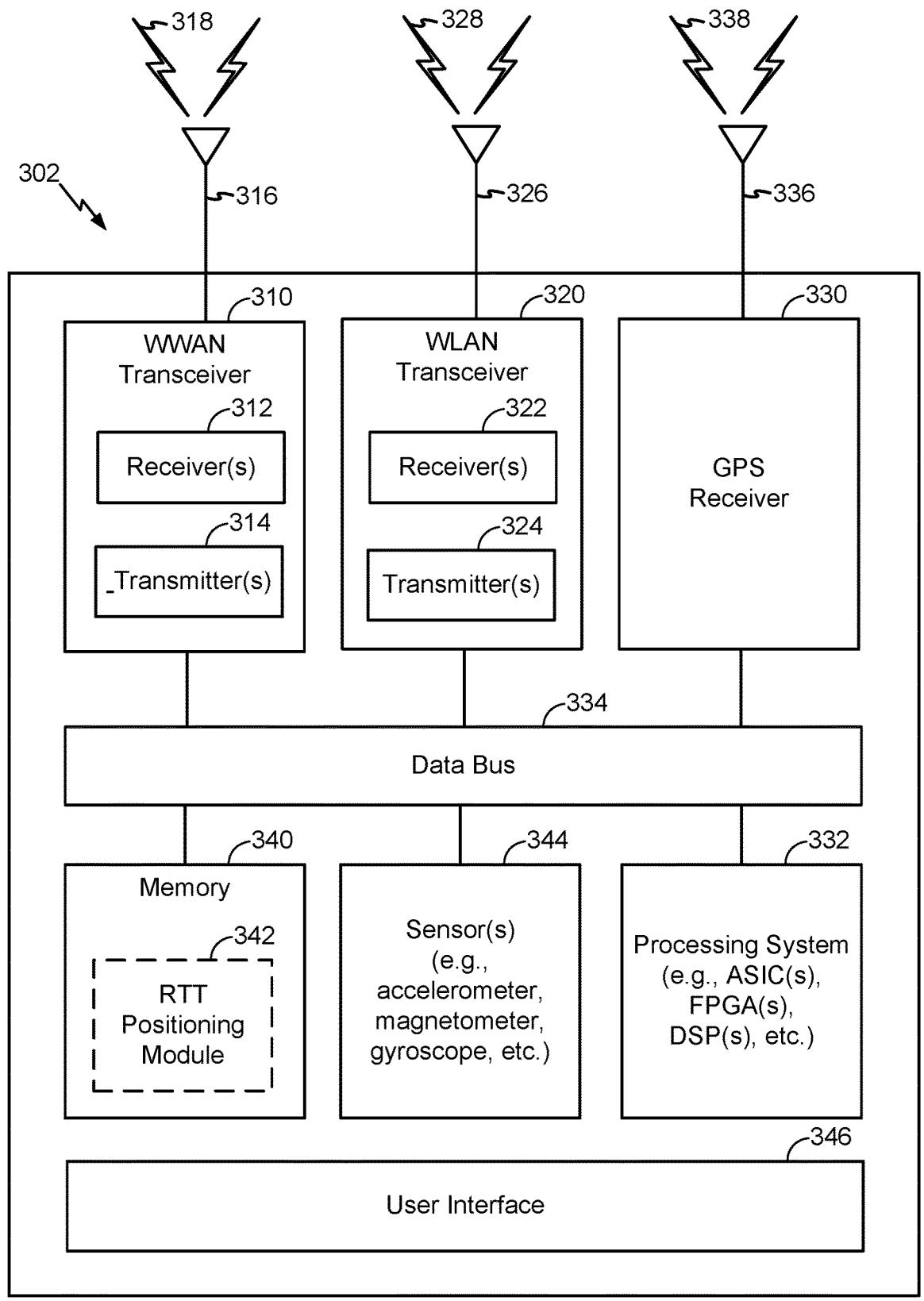
FIGS. 3A to 3C are simplified block diagrams of several sample aspects of components that may be employed in wireless communication nodes and configured to support communication as taught herein.
Figure 3B:
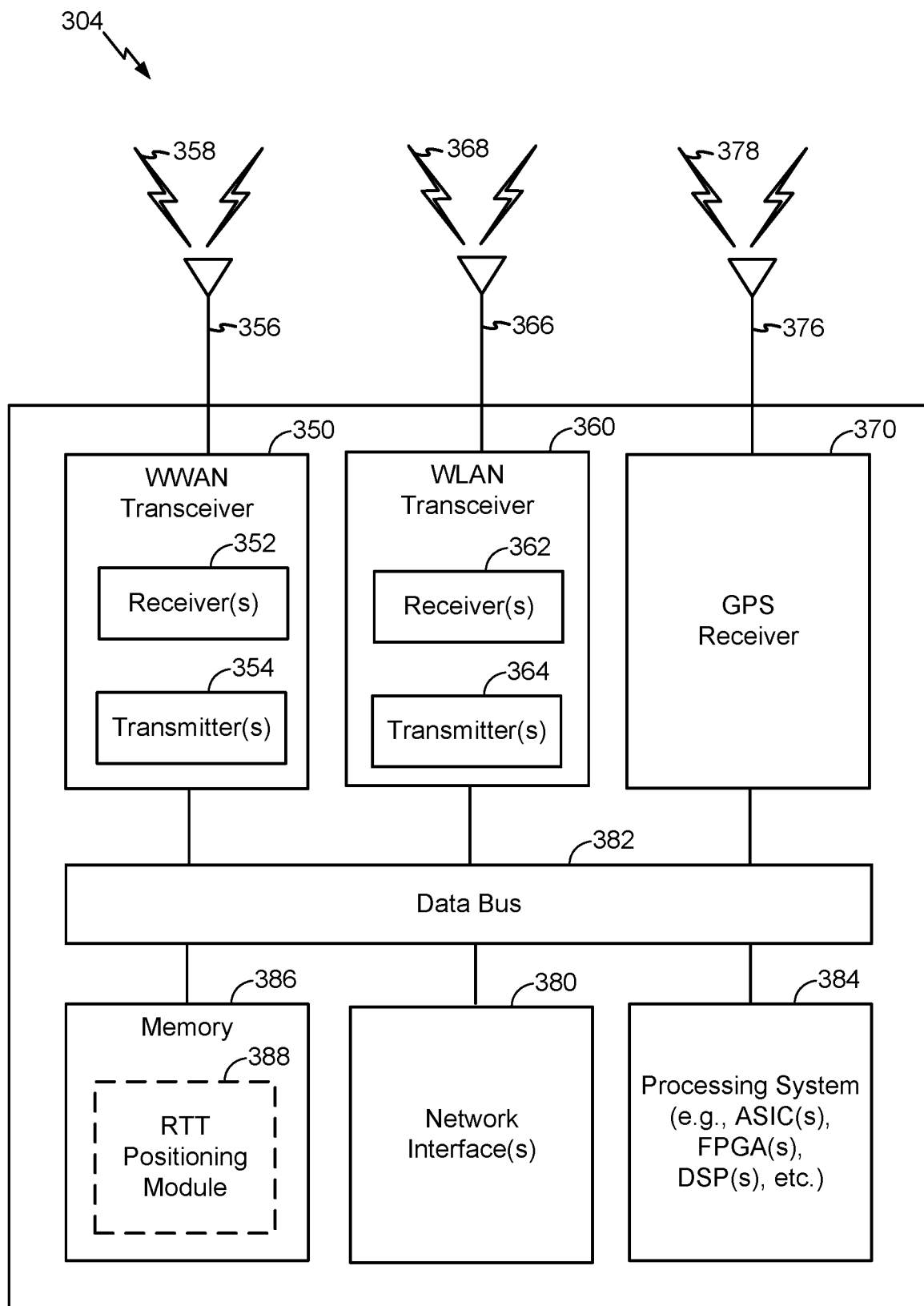
Figure 3C:
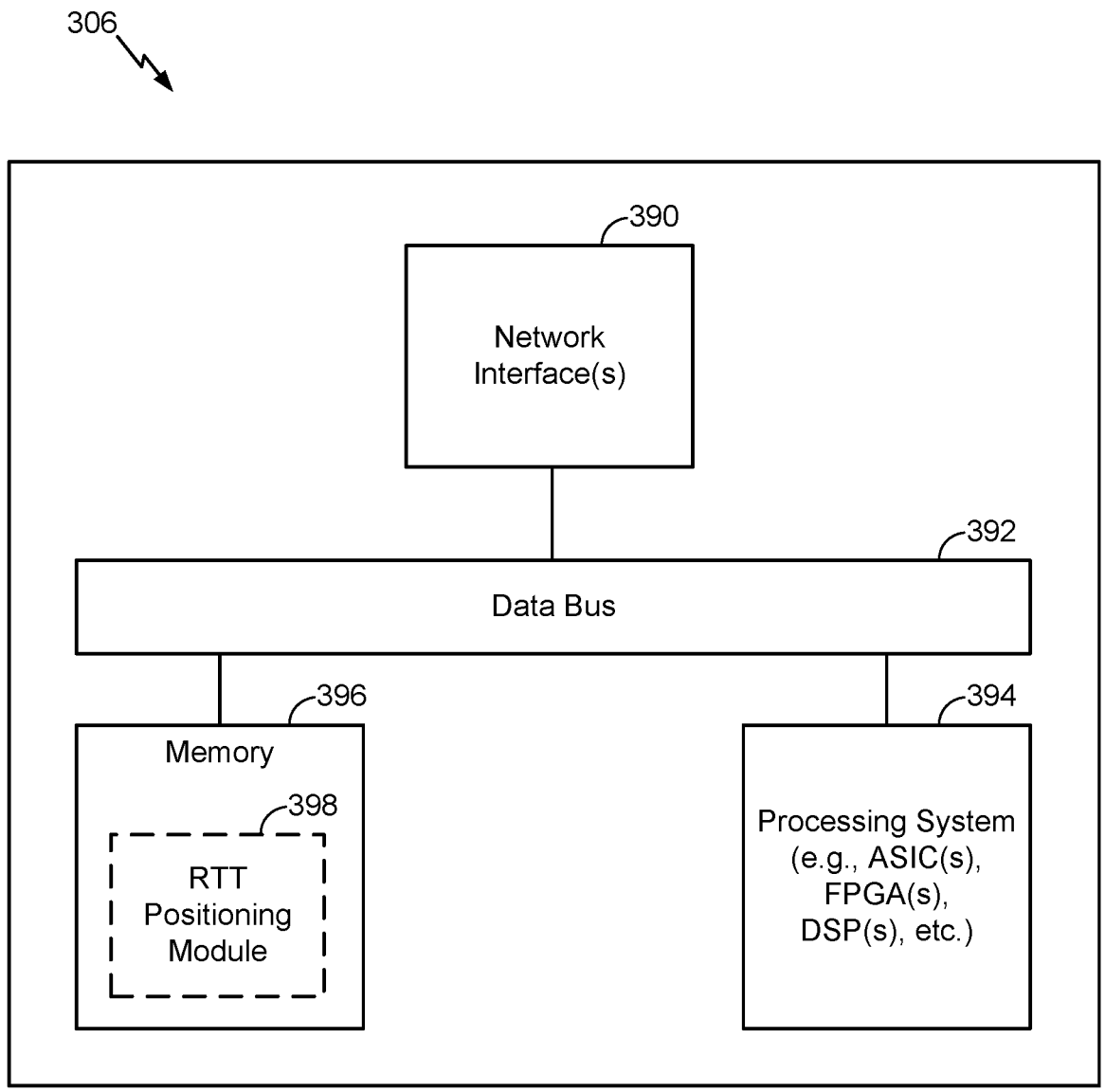

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, global positioning systems (GPS) receivers 330 and 370. The GPS receivers 330 and 370 may be connected to one or more antennas 336 and 376, respectively, for receiving GPS signals 338 and 378, respectively. The GPS receivers 330 and 370 may comprise any suitable hardware and/or software for receiving and processing GPS signals 338 and 378, respectively. The GPS receivers 330 and 370 request information and operations as appropriate from the other systems, and performs calculations necessary to determine the apparatus' 302 and 304 positions using measurements obtained by any suitable GPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, RTT measurements in a licensed or unlicensed frequency band as disclosed herein and for providing other processing functionality. The base station 304 includes a processing system 384 for providing functionality relating to, for example, RTT measurements in a licensed or unlicensed frequency band as disclosed herein and for providing other processing functionality. The network entity 306 includes a processing system 394 for providing functionality relating to, for example, RTT measurements in a licensed or unlicensed frequency band as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include RTT positioning modules 342, 388, and 398, respectively. The RTT positioning modules 342, 388, and 398 may be hardware circuits that are part of or coupled to the processing systems 332, 384, and 394, respectively, that, when executed, cause the apparatuses 302, 304, and 306 to perform the functionality described herein. Alternatively, the RTT positioning modules 342, 388, and 398 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RTT positioning modules 342, 388, and 398, etc.

Figure 4:
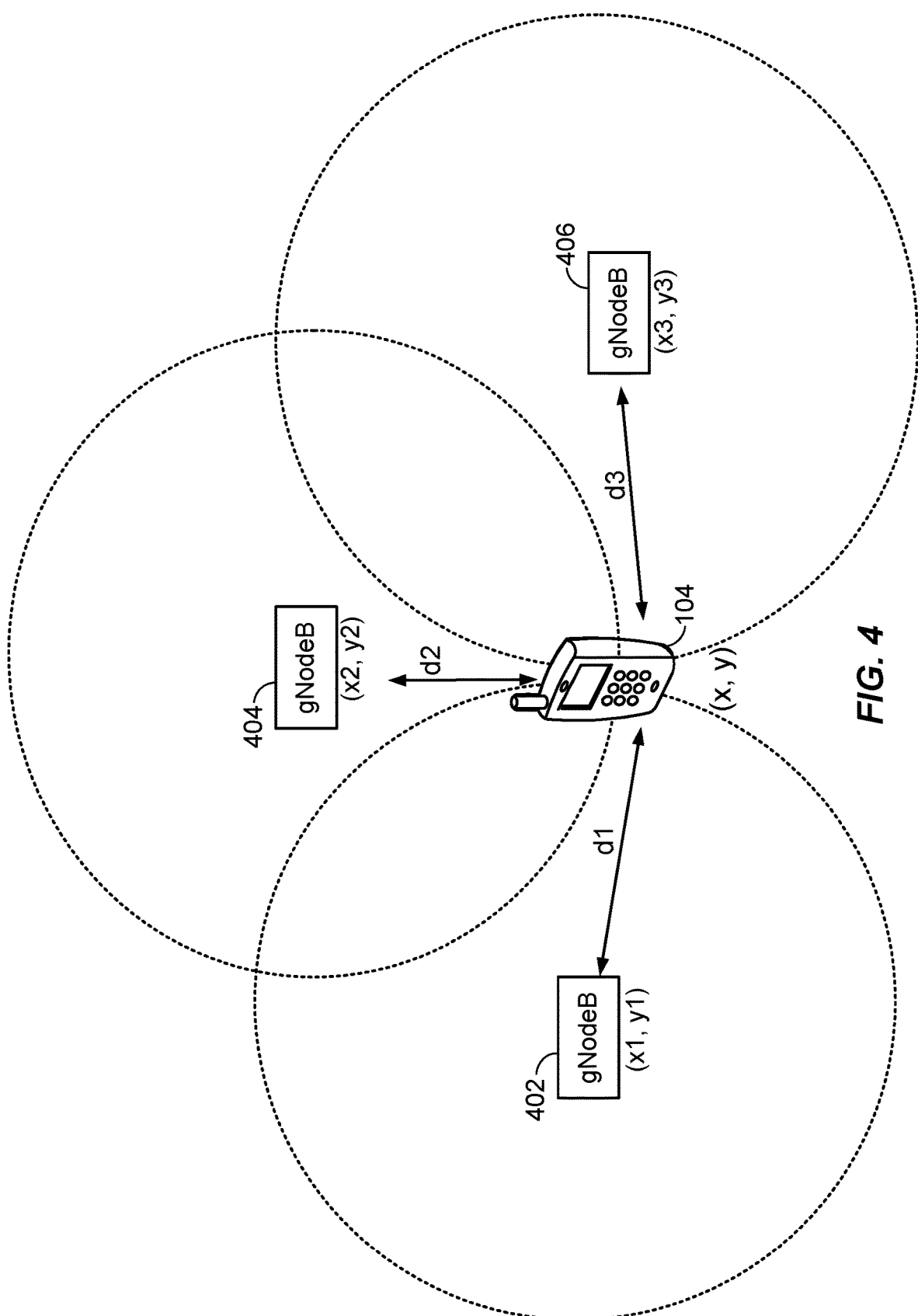
FIG. 4 illustrates an exemplary technique for determining a position of a UE.

A simplified environment is shown in FIG. 4 for illustrating an exemplary technique for determining a position of a UE 104. The UE 104 may communicate wirelessly with a plurality of gNodeBs 402-406 using radio frequency (RF) signals and standardized protocols for the modulation of the RF signals and the exchanging of information packets. By extracting different types of information from the exchanged signals, and utilizing the layout of the network (i.e., the network geometry) the UE 104 or any of the gNodeBs 402-406 may determine the UE 104's position in a predefined reference coordinate system. As shown in FIG. 4, the position (x, y) of the UE 104 may be specified using a two-dimensional coordinate system; however, the aspects disclosed herein are not so limited, and may also be applicable to determining positions using a three-dimensional coordinate system, if the extra dimension is desired. Additionally, while three gNodeBs 402-406 are shown in FIG. 4, aspects may utilize additional gNodeBs.

If the UE 104 is to determine its position (x, y), the UE 104 may first need to determine the network geometry. The network geometry can include the positions of each of the gNodeBs 402-406 in a reference coordinate system (($x_k$, $y_k$), where k=1, 2, 3). The network geometry may be provided to the UE 104 in any manner, such as, for example, providing this information in beacon signals, providing the information using a dedicated server external on an external network, providing the information using uniform resource identifiers, providing the information through base station almanac (BSA), etc.

In determining the position of the UE 104, whether by the UE 104 (UE-based) or by the network (UE-assisted), a distance ($d_k$, where k=1, 2, 3) of the UE 104 to each of the gNodeBs 402-406 is determined. As will be described in more detail below, there are a number of different approaches for estimating these distances ($d_k$) by exploiting different characteristics of the RF signals exchanged between the UE 104 and gNodeBs 402-406. Such characteristics may include, as will be discussed below, the roundtrip propagation time of the signals.

In other aspects, the distances ($d_k$) may in part be determined or refined using other sources of information that are not associated with the gNodeBs 402-406. For example, other positioning systems, such as GPS, may be used to provide a rough estimate of $d_k$. (Note that it is likely that GPS may have insufficient signal in the anticipated operating environments (indoors, metropolitan, etc.) to provide a consistently accurate estimate of $d_k$. However GPS signals may be combined with other information to assist in the position determination process.) Other relative positioning devices may reside in the UE 104 which can be used as a basis to provide rough estimates of relative position and/or direction (e.g., on-board accelerometers).

Once each distance $d_k$ is determined, the UE 104's position (x, y) may be solved by using a variety of known geometric techniques, such as, for example, trilateration. From FIG. 4, it can be seen that the position of the UE 104 ideally lies at the intersection of the circles (or spheres) drawn using dotted lines. Each circle (or sphere) being defined by radius $d_k$ and center ($x_k$, $y_k$), where k=1, 2, 3. In practice, the intersection of these circles (or spheres) may not lie at a single point due to the noise and other errors in the networking system.

Determining the distance between the UE 104 and each gNodeB 402-406 may involve exploiting time information of the RF signals. In an aspect, determining the RTT of signals exchanged between the UE 104 and a gNodeB 402-406 can be performed and converted to a distance ($d_k$). RTT techniques can measure the time between sending a data packet and receiving a response. These methods utilize calibration to remove any processing delays. In some environments, it may be assumed that the processing delays for the UE 104 and the gNodeBs 402-406 are the same. However, such an assumption may not be true in practice.

A position estimate (e.g., for a UE 104) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

As mentioned above, OTDOA and RTT are techniques to determine a position of a UE. However, they both have their limitations. In OTDOA, synchronizing time among the gNodeBs at their Tx antennas is an important factor for positioning accuracy. Unfortunately, this can be complex to maintain. Otherwise, the frame-boundaries identified by the UE from different gNodeBs can have arbitrary timing relations, which in turn can lead to compromising the accuracy of the UE's position determination. It should be noted that maintaining synchronization at Tx antennas of the gNodeBs involves measuring the delay between the digital domain and physical transmission or ensuring they are the same for different gNodeBs.

Another factor for achieving positioning accuracy in OTDOA is that group delay from physical signal reception at the UE Rx antennas to conversion to the digital domain (where TDOAs are measured) be the same for all gNodeBs measured. Alternatively, differences in group delays can be allowed, but the differences should be compensated for to achieve the desired positioning accuracy. The quantity of interest is the flight time between the Tx and Rx antennas, which should exclude this group-delay. However, since TDOA is used, only differences in the group delays are of significance, not the absolute group delays.

With RTT on the other hand, maintaining time synchronization among the gNodeBs is not necessary for position determination. This is because a separate ranging procedure can be followed by the UE with each gNodeB. However, to avoid over-estimating the range, determining absolute values of the group delays can be very beneficial.

Figure 5A:
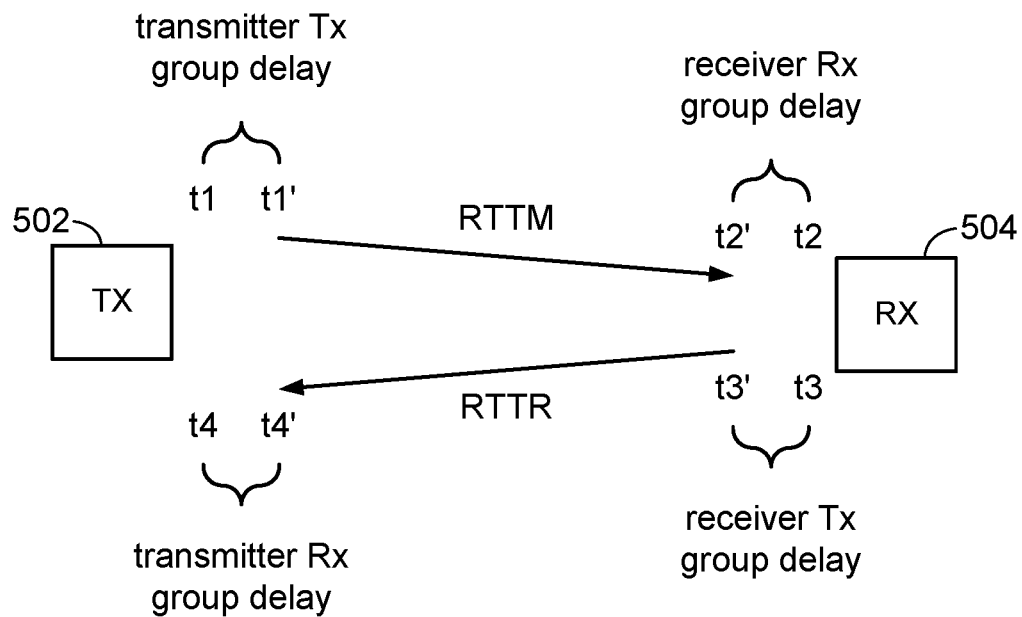
FIG. 5A illustrates a scenario for determining RTT between a transmitter and a receiver.
Figure 5B:
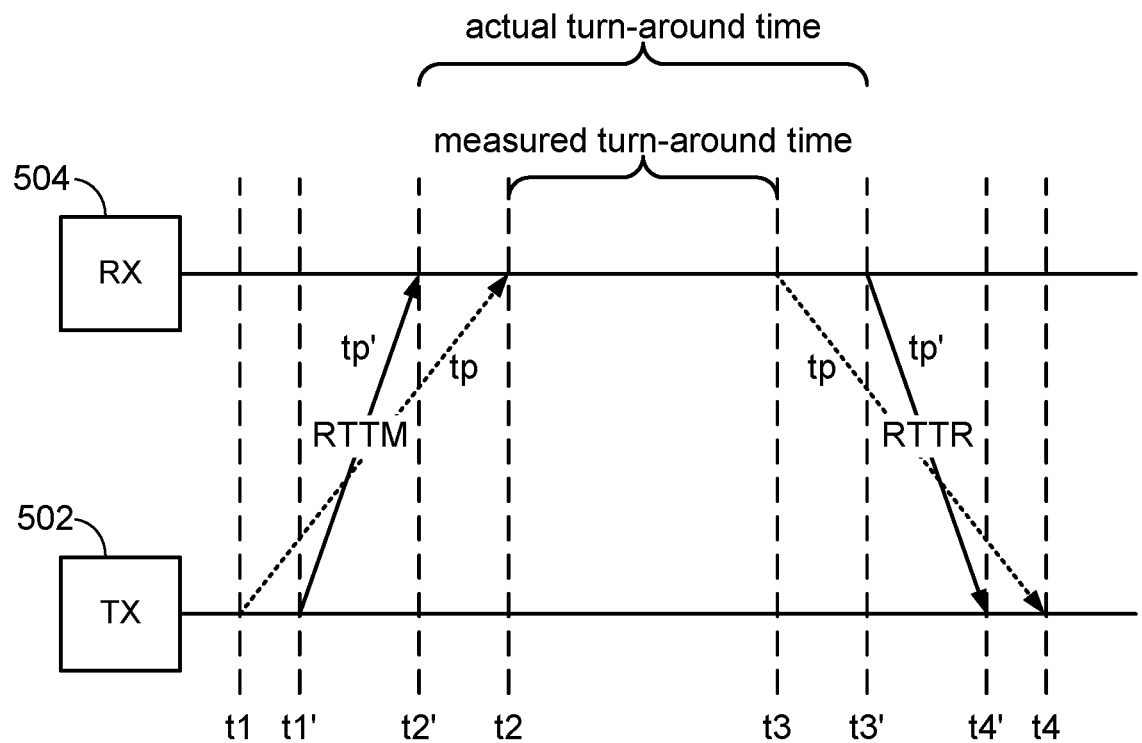
FIG. 5B is a diagram showing exemplary timings within an RTT occurring in the scenario of FIG. 5A during a wireless probe request and a response.

The concept of group delays will be described with respect to FIGS. 5A and 5B. FIG. 5A illustrates an RTT scenario between a transmitter 502 and a receiver 504, and FIG. 5B is a diagram showing exemplary timings within an RTT occurring during a wireless probe request and a response between the transmitter 502 and the receiver 504. For a network centric (UE-assisted) RTT determination, the transmitter 502 may correspond to a network node (e.g., any of the base stations described herein) and the receiver 504 may correspond to a UE (e.g., any of the UEs described herein). For a UE centric RTT determination, the transmitter 502 may correspond to the UE and the receiver 504 may correspond to the network node.

To determine the RTT (and hence distance) between the transmitter 502 and the receiver 504, the transmitter 502 sends an RTT measurement (RTTM) signal at a first time, referred to as "t1." After some propagation time, the receiver 504 detects that the RTTM signal is received at a second time, referred to as "t2." Subsequently, the receiver 504 takes some turn-around time "Δ" to process the received RTTM signal before sending an RTT response (RTTR) signal at a third time, referred to as "t3." After the propagation time, the transmitter 502 detects that the RTTR signal is received at a fourth time, referred to as "t4." Thus, the measured flight time or RTT (referred to as "tp" for "propagation time") may be calculated as:

$$\text{measured RTT} = (t4-t1)-(t3-t2), \quad (1)$$

where (t4−t1) is the measured total time, and (t3−t2) is the measured turn-around time at the receiver 504.

Times t1, t2, t3, and t4 are the times as measured by the transmitter 502 and the receiver 504 in the digital domain. However, in reality, the RTTM signal actually leaves the transmitter 502 at some time after t1, referred to as "t1'," and arrives at the receiver 504 at some time before t2, referred to as "t2'." Also, the RTTR signal actually leaves the receiver 504 at some time after t3, referred to as "t3'," and arrives at the transmitter 502 at some time before t4, referred to as "t4'." This means that the actual flight time or RTT (referred to as "tp'") is as follows:

$$\text{actual RTT} = (t4'-t1')-(t3'-t2'), \quad (2)$$

where (t4'−t1') is the actual total time, and (t3'−t2') is the actual turn-around time at the receiver 504.

The discrepancy between the measured times (e.g., t1, t2, t3, t4) and the actual times (e.g., t1', t2', t3', t4') is explained as follows. In wireless communications, a source device (or simply "source") transmits signals to a destination device (or simply "destination"). In order to transmit a digital signal, a Tx RF chain (also referred to as an RF front end (RFFE)) at the source performs a process to convert the digital signal into an RF signal. For example, the source's Tx RF chain (or simply "Tx chain") can include a digital-to-analog converter (DAC) to convert the digital signal into a baseband analog signal, an upconverter to upconvert the baseband signal into an RF signal, and a power amplifier (PA) to amplify the RF signal, which is then radiated from the antenna(s) of the source.

The destination can include an Rx RF chain (or simply "Rx chain") to perform a reverse process to retrieve the original digital signal from the arriving RF signal. For example, the destination's Rx RF chain (or simply "Rx chain") can include a filter (e.g., low pass, high pass, band pass) to filter the RF signal received by the antenna(s) of the destination, a low noise amplifier (LNA) to amplify the filtered RF signal, a downconverter to downconvert the filtered RF signal into the baseband signal, and an analog-to-digital (ADC) converter to recover the digital signal from the baseband signal.

The process performed by the source's Tx chain to convert the digital signal onto the RF signal takes a finite amount of time (generically referred to as "Tx group delay"). The Tx group delay may be said to represent a delay between a measured transmission time of a signal and an actual time of the signal leaving the source (e.g., t1'−t1). The reverse process performed by the destination's Rx chain to recover the digital signal from the RF signal also takes a finite amount of time (generically referred to as "Rx group delay"). The Rx group delay may be said to represent the delay between an actual time of a signal arriving at the destination and a measured arrival time of the signal (e.g., t2−t2').

The term "group delay" is used to emphasize that the delay is caused by elements in the Tx/Rx chain as described above, which may include filters, and may result in a delay that is a function of frequency, RAT, carrier aggregation (CA), component carrier (CC), and so on.

With continued reference to FIGS. 5A and 5B, it is seen that each of the transmitter 502 and the receiver 504 includes both the Tx and Rx group delays. The total group delay (or simply "group delay") for each device may be determined by summing their respective Tx and Rx group delays. Then, the group delay (GD) for the transmitter 502 may be expressed as:

$$GD=(t1'-t1)+(t4-4'). \quad (3)$$

Also, the GD for the receiver 504 may be expressed as:

$$GD=(t3'-t3)+(t2-t2'). \quad (4)$$

From equations (1) and (2), it will be appreciated that if the RTT measurements are based on the measured times alone, then the distance between the transmitter 502 and the receiver 504 can be overestimated. However, if the group delays can be accounted for, then the actual RTT can be determined. This illustrates that for RTT, accurate determination of the group delays is important.

As mentioned above, inter-gNodeB timing synchronization and group delays are factors that affect positioning accuracies for both OTDOA and RTT techniques. But also as mentioned above, for OTDOA, while tight inter-gNodeB timing synchronization is important, loose group delays can be tolerated. But for RTT, it is the other way around. That is, tight group delays are important, but loose inter-gNodeB timing synchronization can be tolerated. Both requirements should be such that they do not limit positioning accuracy. With tighter accuracy targets in NR (e.g., centimeter-level for factory automation scenarios), these requirements also need to be tighter.

To address these issues, it is proposed perform a differential RTT based positioning procedure to determine a position of the UE. Broadly, the differential RTT based positioning procedure may be viewed as a technique to determine a position of the UE (UE position) based on differences of RTTs among a plurality of RTTs. The proposed differential RTT based positioning allows for looser inter-gNodeB synchronization relative to the conventional OTDOA technique. At the same time, the proposed differential RTT based positioning procedure allows for looser group delays relative to conventional RTT techniques. In other words, the differential RTT based positioning procedure described herein has the advantages of both the conventional OTDOA and RTT techniques, without their disadvantages. This can also lead to lower complexity and device cost.

Figure 6:
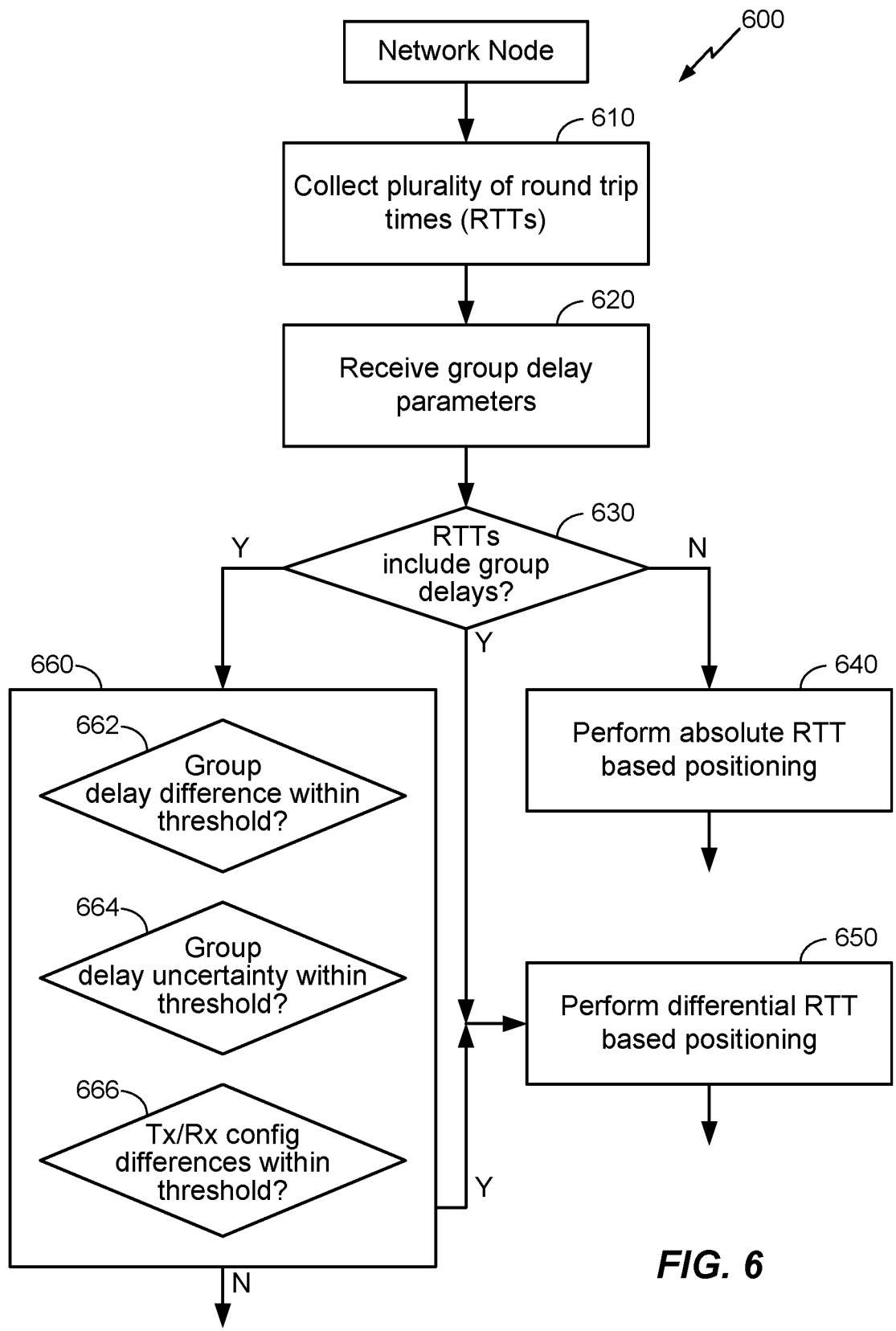
FIG. 6 illustrates an exemplary method performed by a network node to determine a UE position according to an aspect of the disclosure.

FIG. 6 illustrates an example method 600 performed by a network node to determine a UE position, according to aspects of the disclosure. In an aspect, the network node may be a location server (e.g., location server 230, LMF 270) or other positioning entity, and may be located in the core network (e.g., NGC 260), in the RAN (e.g., at the serving base station), or at the UE (e.g., for UE-based positioning).

At 610, the network node may collect a plurality of RTTs between a UE and a plurality of base stations (e.g., gNodeBs). Each RTT may be associated with a single BS of the plurality of BSs. Each RTT may represent a total flight time of an RTT signal back and forth between the UE and the associated BS. For example, each RTT may represent the flight times of the RTTM and RTTR signals (see FIGS. 5A, 5B) between the UE and the associated BS.

In an aspect, where the network node is a network entity, operation 610 may be performed by the network interface(s) 390, the processing system 394, the memory 396, and/or the RTT positioning module 398, any or all of which may be considered means for performing this operation. In an aspect, where the network node is a base station, operation 610 may be performed by WWAN transceiver 350, the network interface(s) 380, the processing system 384, the memory 386, and/or the RTT positioning module 388, any or all of which may be considered means for performing this operation. In an aspect, where the network node is a UE, operation 610 may be performed by the WWAN transceiver 310, the processing system 332, the memory 340, and/or the RTT positioning module 342, any or all of which may be considered means for performing this operation.

In one aspect, collecting the plurality of RTTs may involve receiving one or more RTT reports from the UE in which the one or more RTT reports include the plurality of RTTs. In this aspect, it may be assumed that the UE determines the RTTs. For example, the UE may determine the RTTs between itself and the BSs. If the BS serving the UE (e.g., serving gNodeB) is the network node, the network node may receive the one or more RTT reports directly. On the other hand, if the serving BS is not the network node, the one or more RTT reports may be received from the UE via the serving BS.

In another aspect, collecting the plurality of RTTs may involve receiving the one or more RTT reports from the serving BS. In this aspect, it may be assumed that the RTTs are determined on the network side. For example, each BS may determine the RTT between itself and the UE, and report the RTT to the serving BS. The serving BS in turn may gather the RTTs from the BSs into the one or more RTT reports and provide the one or more RTT reports to the UE. The serving BS may itself determine the RTT between itself and the UE, which may be included in the plurality of RTTs of the one or more RTT reports.

In yet another aspect, if the serving BS is the network node and the RTTs are determined on the network side, then collecting the plurality of RTTs may involve gathering the RTTs from the from the BSs (including itself). In general, computing each RTT involves a measurement by both the nodes (e.g., a UE and a gNB) between which the RTT procedure is carried out. The positioning engine, or location server, that computes the final position, receives these measurements for multiple RTT procedures between the UE and the multiple base stations, or receives the RTTs directly, where each RTT has been computed by another node that received both the needed measurements. The positioning engine may be physically located in the UE, the base station, or elsewhere in the network. The nodes involved in computing RTTs, communicating the RTT related measurements, or the RTTs may also be the UE, base station, or other network node. Special examples of this (e.g., with the location server located in the base station) were described earlier, but it is to be understood that the disclosure is not limited to these examples.

At 620, the network node may receive group delay parameters. These are parameters related to the plurality of RTTs. If the plurality of RTTs is received from the UE, the group delay parameters may also be received from the UE. For example, the group delay parameters may be included in one or more positioning protocol signals from the UE. Examples of the positioning protocol signals include LTE positioning protocol (LPP) signal. As another example, the group delay parameters may be received from the UE separately from the plurality of RTTs, such as in capability information of the UE.

In an aspect, where the network node is a network entity, operation 620 may be performed by the network interface(s) 390, the processing system 394, the memory 396, and/or the RTT positioning module 398, any or all of which may be considered means for performing this operation. In an aspect, where the network node is a base station, operation 620 may be performed by the WWAN transceiver 350, the network interface(s) 380, the processing system 384, the memory 386, and/or the RTT positioning module 388, any or all of which may be considered means for performing this operation. In an aspect, where the network node is a UE, operation 620 may be performed by the WWAN transceiver 310, the processing system 332, the memory 340, and/or the RTT positioning module 342, any or all of which may be considered means for performing this operation.

If the plurality of RTTs is received from the network, such as from the serving BS, the group delay parameters may also be received from the serving BS. For example, the group delay parameters may be included in one or more positioning protocol annex signals from the serving BS. Examples of the positioning protocol annex signals include LTE positioning protocol annex (LPPa) signaling and New Radio positioning protocol annex (NR-PPa) signaling.

If the serving BS is the network node and the RTTs are determined on the network side, information related to the group delay parameters may be gathered from the other BSs, such as through one or more backhaul links/interfaces.

At 630, the network node may determine whether the UE and/or the BS group delays are included in the plurality of RTTs. In one aspect, the group delay parameters received at 620 from the UE or the serving BS may include an RTT type parameter indicating whether the plurality of RTTs is a plurality of measured RTTs or actual RTTs. Recall that the measured RTT (e.g., (t4−t1)−(t3−t2)) is in the digital domain, which does not factor out the group delays. Therefore, if the RTT type parameter indicates that the plurality of RTTs is a plurality of measured RTTs, then it may be determined that the group delays are included in the plurality of RTTs. On the other hand, if the RTT type parameter indicates that the plurality of RTTs is a plurality of actual RTTs, this means that the group delays have been factored out.

In an aspect, where the network node is a network entity, operation 630 may be performed by the processing system 394, the memory 396, and/or the RTT positioning module 398, any or all of which may be considered means for performing this operation. In an aspect, where the network node is a base station, operation 630 may be performed by the processing system 384, the memory 386, and/or the RTT positioning module 388, any or all of which may be considered means for performing this operation. In an aspect, where the network node is a UE, operation 630 may be performed by the processing system 332, the memory 340, and/or the RTT positioning module 342, any or all of which may be considered means for performing this operation.

If at 630 it is determined that the plurality of RTTs do not include the UE group delays and also do not include the BS group delays ("N" branch from 630), then the method 600 may proceed to 640 to determine the UE position through an absolute RTT based positioning procedure. When the group delays are not included in the plurality of RTTs, this means each RTT is an actual RTT (e.g., (t4'−t1')−(t3'−t2')). To state it another way, the groups delays have been taken into account when the RTTs do not include the group delays.

Figure 7:
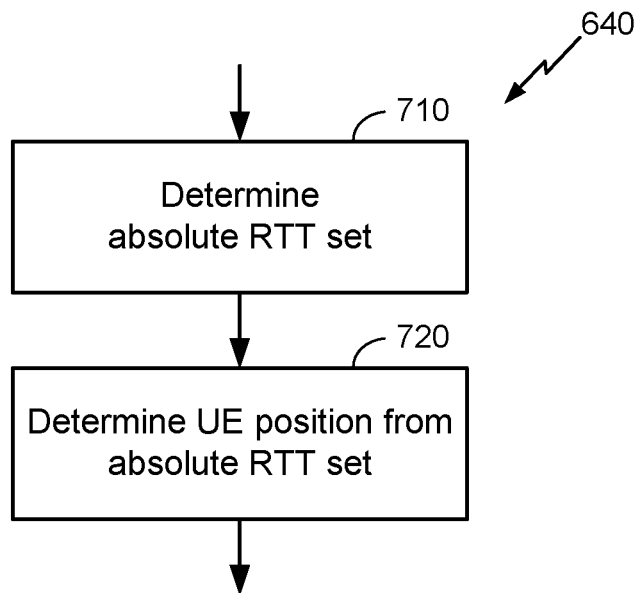
FIG. 7 illustrates an exemplary process performed by a network node to determine a UE position through absolute RTT based positioning according to an aspect of the disclosure.

FIG. 7 illustrates an example process performed by the network node to implement the absolute RTT based positioning technique at 640. Note that if the RTTs are actual RTTs, concerns with overestimating the actual distances are reduced. Therefore, at 710, the network node may determine an absolute RTT set based on the plurality of RTTs. The absolute RTT set may comprise one or more absolute members. Each absolute member may correspond to one of the RTTs, i.e., correspond to one of the BSs. Each absolute member may represent an absolute distance between the UE and the corresponding BS calculated based on the RTT associated with the corresponding BS.

In an aspect, where the network node is a network entity, operation 710 may be performed by the processing system 394, the memory 396, and/or the RTT positioning module 398, any or all of which may be considered means for performing this operation. In an aspect, where the network node is a base station, operation 710 may be performed by the processing system 384, the memory 386, and/or the RTT positioning module 388, any or all of which may be considered means for performing this operation. In an aspect, where the network node is a UE, operation 710 may be performed by the processing system 332, the memory 340, and/or the RTT positioning module 342, any or all of which may be considered means for performing this operation.

At 720, the network node may determine the UE position based on the absolute RTT set. For example, assuming that the physical locations of the BSs are known, each absolute distance can be translated into an appropriately sized circle (or sphere) with the associated BS at its center. The UE position may be then determined from the intersections of the circles (or spheres). It is to be noted that many different procedures could be used to compute the location of the intersection. For example, the location may be computed by an analytical formula involving the base station location coordinates $r_i$ and corresponding UE-to-base station distances $D_i$ estimated by the RTT procedure between the UE and the i-th base station. In another example, an iterative scheme may be used to find the location coordinate vector r that minimizes a cost function such as the sum of $\|r-r_i\|-D_i\|$ or $\|r-r_i\|^2-D_i^2\|$ over all base stations 'i', where |x| represents the distance of the point with coordinate vector x from the origin of the coordinate frame used to describe the coordinate vectors. The scope of the step described as "determining the intersections of circles (or spheres)" encompasses any such procedures.

In an aspect, where the network node is a network entity, operation 720 may be performed by the processing system 394, the memory 396, and/or the RTT positioning module 398, any or all of which may be considered means for performing this operation. In an aspect, where the network node is a base station, operation 720 may be performed by the processing system 384, the memory 386, and/or the RTT positioning module 388, any or all of which may be considered means for performing this operation. In an aspect, where the network node is a UE, operation 720 may be performed by the processing system 332, the memory 340, and/or the RTT positioning module 342, any or all of which may be considered means for performing this operation.

Note that the number of absolute members in the absolute RTT set need not be equal to the number of RTTs in the plurality of RTTs. In most instances, three RTTs may be necessary (to generate three circles or spheres) to narrow the UE position to a single location in two dimensions, and four RTTs may be necessary (to generate four spheres) to narrow the UE position to a single location in three dimensions. Additional RTTs, while not strictly necessary, can increase the positioning accuracy.

Referring back to FIG. 6, if it is determined that the plurality of RTTs do include the UE group delays and/or the BS group delays (middle "Y" branch from 630), then in one aspect, the method 600 may proceed to 650 to determine the UE position through the differential RTT based positioning. Unlike the absolute RTT based positioning technique, the differential RTT based positioning technique is much less sensitive to the presence of group delays. This is because the effects of the group delay in one RTT are canceled, at least in part, by the group delay in another RTT.

Figure 8:
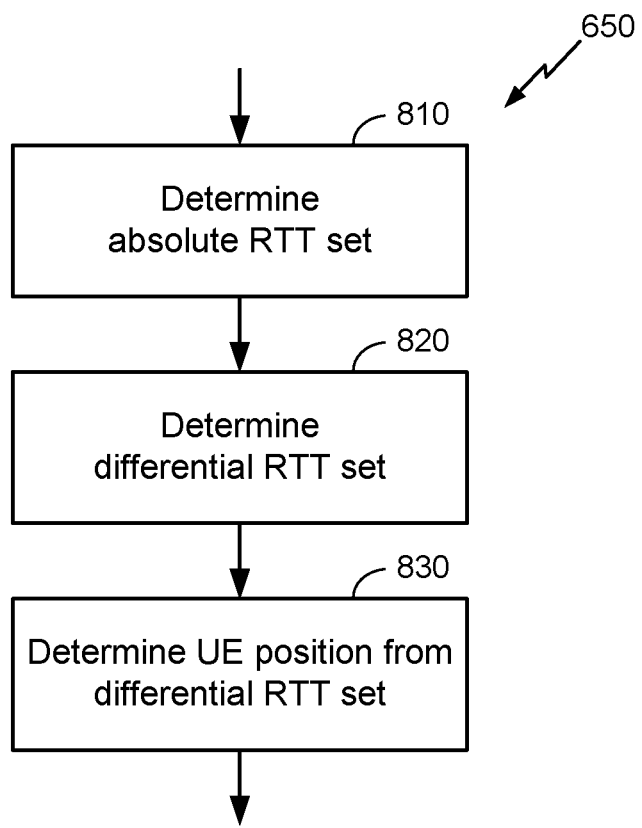
FIG. 8 illustrates an exemplary process performed by a network node to determine a UE position through differential RTT based positioning according to an aspect of the disclosure.

FIG. 8 illustrates an example process performed by the network node to implement the differential RTT based positioning technique at 650. Broadly, the differential RTT based positioning may be described as determining the UE position based on the differences of the RTTs among the plurality of RTTs.

At 810, the network node may determine a reference BS among the plurality of BSs. In an aspect, where the network node is a network entity, operation 810 may be performed by the processing system 394, the memory 396, and/or the RTT positioning module 398, any or all of which may be considered means for performing this operation. In an aspect, where the network node is a base station, operation 810 may be performed by the processing system 384, the memory 386, and/or the RTT positioning module 388, any or all of which may be considered means for performing this operation. In an aspect, where the network node is a UE, operation 810 may be performed by the processing system 332, the memory 340, and/or the RTT positioning module 342, any or all of which may be considered means for performing this operation.

At 820, the network node may determine a differential RTT set based on the plurality of RTTs. The differential RTT set may comprise one or more differential members. Each differential member may correspond to one of the RTTs, i.e., correspond to one of the BSs other than the reference BS. Each differential member may represent a differential distance calculated based on a difference in the RTT associated with the reference BS and the RTT associated with the corresponding BS. More specifically, a "differential member" represents a quantity d(UE, node1)−d(UE, node2), where d(UE, nodeN) is the distance between the UE and the node N (e.g., a base station). One of node1 and node2 may be a reference node, meaning that it is chosen as one of the two nodes for all the differential members. In an aspect, where the network node is a network entity, operation 820 may be performed by the processing system 394, the memory 396, and/or the RTT positioning module 398, any or all of which may be considered means for performing this operation. In an aspect, where the network node is a base station, operation 820 may be performed by the processing system 384, the memory 386, and/or the RTT positioning module 388, any or all of which may be considered means for performing this operation. In an aspect, where the network node is a UE, operation 820 may be performed by the processing system 332, the memory 340, and/or the RTT positioning module 342, any or all of which may be considered means for performing this operation.

At 830, the network node may determine the UE position based on the differential RTT set. For example, assuming that the physical locations of the BSs are known, each differential distance, based on a pair of BSs, implies for the case of two-dimensional positioning, that the UE is located on a hyperbola with the locations of those two BSs as the foci. The UE position on the two-dimensional plane may then be determined from the intersections of the hyperbolas. In the case of three-dimensional positioning, the hyperbola is replaced by the hyperboloid surface obtained by revolving the hyperbola around the axis passing through the foci, and the UE's position is obtained as the intersection of these hyperboloids. As described earlier for the case of intersections of circles (or spheres) when absolute RTT is used, the intersections of the hyperbolas (or hyperboloids) may be computed using many different procedures, and the scope of the disclosure includes any such procedure. In an aspect, where the network node is a network entity, operation 830 may be performed by the processing system 394, the memory 396, and/or the RTT positioning module 398, any or all of which may be considered means for performing this operation. In an aspect, where the network node is a base station, operation 830 may be performed by the processing system 384, the memory 386, and/or the RTT positioning module 388, any or all of which may be considered means for performing this operation. In an aspect, where the network node is a UE, operation 830 may be performed by the processing system 332, the memory 340, and/or the RTT positioning module 342, any or all of which may be considered means for performing this operation.

Note that the number of differential members in the differential RTT set need not be equal to the number of RTTs in the plurality of RTTs. In most instances, four RTTs may be necessary (to generate three hyperbolas) to narrow the UE position to a single location in two dimensions, and five RTTs may be necessary (to generate four hyperbolas) to narrow the UE position to a single location in three dimensions. Additional RTTs, while not strictly necessary, can increase the accuracy. More specifically, with only two hyperbolas in a plane, there could be two intersection points. The third hyperbola allows disambiguating between these two points. The number of hyperbolas is one less than the number of RTTs because each hyperbola corresponds to a difference between two RTTs. Note that the hyperbolas to be used should correspond to independent differential members, i.e., with three nodes, there are three RTTs (e.g., a, b, c), and three differential members could be formed, a-b, a-c, and b-c. However, but only two of these would be useful because the third is derivable from the other two, e.g., b-c=(a-c)−(a-b).

Recall that the differential RTT based positioning is advantageous in that both the inter-gNodeB synchronization and group delay requirements can be loosened. The tradeoff is that in the differential RTT based positioning technique, one of the observations—the RTT of the reference BS—is lost. However, when there are more RTTs than the minimum required, the tradeoff cost can be minimal.

As indicated above, the differential RTT based positioning technique is much less sensitive to the presence of group delays relative to the absolute RTT based technique. Referring back to FIG. 6, the middle Y branch from 630 to 650 indicates an aspect in which the differential RTT based positioning technique is used whenever the plurality of RTTs include the group delays, i.e., are measured RTTs.

While the differential RTT based positioning procedure is less sensitive to the group delays, it may not be completely insensitive. When there are differences in the group delays in the plurality of RTTs, inaccuracies can be introduced when the UE position is calculated. Note that the UE group delays in the RTTs may be of little to no concern. This is because when differentials are taken, the UE group delays in the RTTs are canceled. However, BS group delays may be of some concern since different BSs may have different BS group delays.

Therefore, in another aspect, if the plurality of RTTs do include the UE group delays and/or the BS group delays (left "Y" branch from 630), the method 600 may proceed to 660 to determine whether the group delays in the plurality of RTTs are "sufficiently similar" such that inaccuracies introduced due to the differences in the group delays are tolerable. If the group delays, and in particular the BS delays, are determined to be sufficiently similar in 660, then the network node may proceed to 650 to perform the differential RTT based positioning.

Block 660 includes decision blocks 662, 664, and 666. The network node may perform any combination of these blocks, conjunctive or disjunctive, to determine whether to proceed to 650 or not. In an aspect, the group delay parameters received at 620 from the UE or the serving BS may include a group delay difference parameter indicating a difference in the group delays among the plurality of BSs. More specifically, the parameter needed is the difference between the group delays included in different RTT reports (corresponding to different base stations). Each group delay includes a component from the UE and one from the base station. The UE may indicate the UE component. If the UE used similar configurations, such as similar beams, antenna panels, bandwidth, etc., for both the RTT measurements, then it is likely that the difference in the UE component is small/negligible. For the base station component, a comparison is needed across different base stations, so it is more challenging to report their group delay. One way is for each base station to indicate its own parameters, such as its maximum group delay and expected variance/uncertainty in group delay, and the positioning entity then translates these into group delay difference parameters. The parameter indicated may also be, for example, a make and model type indication for the base station, as group delay may be expected to be similar for two base stations of the same make and model. Another option is for the base stations to exchange these parameters among themselves (e.g., via the X2 or Xn interface) and one base station to consolidate, compute, and report these group delay difference parameters to the positioning entity for itself and its one or more neighbors.

At 662, the network node may determine whether or not the difference indicated by the group delay difference parameter is within a threshold difference, which may represent a maximum tolerable group delay difference. The threshold difference may be predetermined and/or dynamically set during operation based on, for example, the requested positioning accuracy. If 662 is applied, then it may be said that the differential RTT based positioning procedure is performed when the UE and/or BS group delays are included in the plurality of RTTs, and when the difference is within the threshold difference.

In another aspect, the group delay parameters or RTT related measurements (such as Rx–Tx timing difference) received at 620 from the UE or the serving BS may include a group delay uncertainty parameter indicating a level of uncertainty in the group delays among the plurality of BSs. The value may be based on internal details of how the base station's RF front-end is implemented. For example, a base station that calibrates its group delay (either as part of the factory manufacturing procedure or on the fly over-the-air) is likely to have less uncertainty in the group delay, and the uncertainty may depend on how long ago the calibration took place.

At 664, the network node may determine whether or not the uncertainty indicated by the group delay uncertainty parameter is within a threshold uncertainty, which may represent a maximum tolerable group delay uncertainty. The threshold uncertainty may be predetermined and/or dynamically set during operation based on, for example, the requested positioning accuracy. If 664 is applied, then it may be said the differential RTT based positioning procedure is performed when the UE and/or BS group delays are included in the plurality of RTTs, and when the uncertainty is within the threshold uncertainty.

In yet another aspect, the group delay parameters received at 620 from the UE or the serving BS may include one or more Tx/Rx configurations. Each Tx/Rx configuration may correspond to a BS of the plurality of BSs, and may comprise link parameters associated with a communication link established between the UE and the corresponding BS for determining the RTT there between. Link parameters may include any one or more of Tx/Rx beams, Tx-power used, bandwidth, component carrier index, frequency band, RAT (such as LTE or NR), etc. Similar configurations may be associated with similar group delays. Configuration parameters may also include details such as the make and/or model of the BS; for example, identical models may be expected to have similar group delays. It should be noted that some parameters, such as bandwidth, may be known to the network, and therefore, need not be reported.

At 666, the network node may determine whether or not differences among the Tx/Rx configurations (i.e., differences across different RTT measurements) are within a threshold Tx/Rx configuration difference, which may represent a maximum tolerable configuration difference. The threshold Tx/Rx configuration difference may be predetermined and/or dynamically set during operation based on, for example, the requested positioning accuracy. If 666 is applied, then it may be said the differential RTT based positioning is performed when the UE and/or BS group delays are included in the plurality of RTTs, and when the configuration differences among the Tx/Rx configurations are within the threshold Tx/Rx configuration difference.

In an aspect, where the network node is a network entity, operations 662, 664, and 666 may be performed by the processing system 394, the memory 396, and/or the RTT positioning module 398, any or all of which may be considered means for performing this operation. In an aspect, where the network node is a base station, operations 662, 664, and 666 may be performed by the processing system 384, the memory 386, and/or the RTT positioning module 388, any or all of which may be considered means for performing this operation. In an aspect, where the network node is a UE, operations 662, 664, and 666 may be performed by the processing system 332, the memory 340, and/or the RTT positioning module 342, any or all of which may be considered means for performing this operation.

Figure 9:
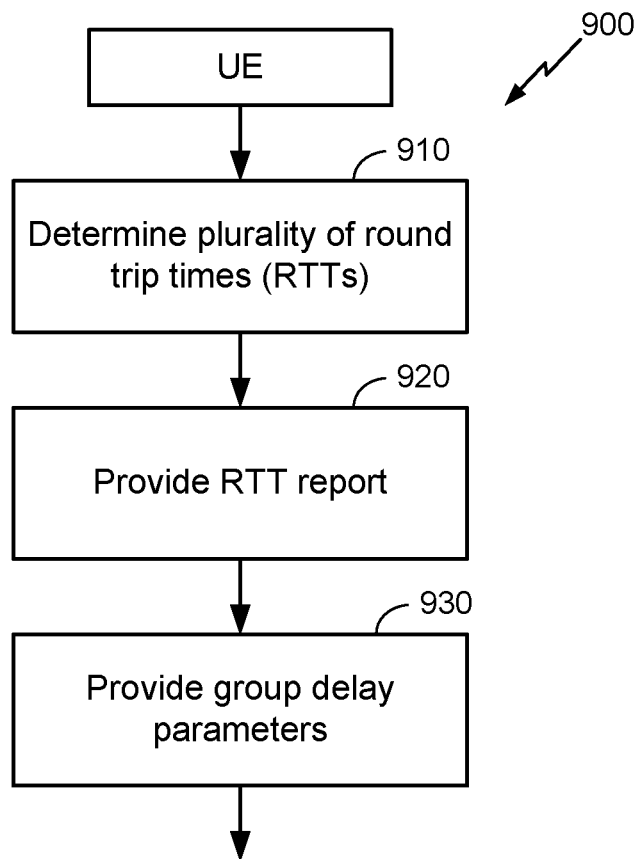
FIG. 9 illustrates an exemplary method performed by a UE to determine a UE position according to an aspect of the disclosure.

FIG. 9 illustrates an example method 900 performed by the UE in assisting the network to determine the UE position, according to aspects of the disclosure. At 910, the UE may determine a plurality of RTTs. For example, the UE may exchange RTT signals with a plurality of BSs and determine the associated RTTs. If the BSs provide their BS group delays, then the UE may factor out the group delays from the RTTs such that the plurality of RTTs are actual RTTs.

At 920, the UE may provide the plurality of RTTs to the network node in an RTT report. If the UE knows the BS group delays, it may provide the actual RTTs to the network node, or the measured RTTs and the BS group delays. Otherwise, it simply provides the measured RTTs. As indicated above, the network node may determine whether to perform the differential RTT based positioning procedure to determine the UE position based on the differences of the RTTs among the plurality of RTTs included in the RTT report.

At 930, based on the UE and/or the BS group delays, the UE may provide the group delay parameters to the network node. The group delay parameters may indicate whether or not the group delays were included in the RTTs reported at 920, and if so, for which RTTs/BSs. The group delay parameters may be included in one or more positioning protocol signals to the network node. Examples of the positioning protocol signals include LPP signaling. The group delay parameters may also include any one or more of the RTT type parameter, the group delay difference parameter, the group delay uncertainty parameter, and one or more Tx/Rx configurations.

Note that while FIG. 9 is described in terms of a UE, one or more base stations may perform a similar method with a single UE.

It should be noted that not all illustrated blocks of FIGS. 6 to 9 need be performed, i.e., some blocks may be optional. Also, the numerical references to the blocks in these figures should not be taken as requiring that the blocks should be performed in a certain order. Indeed, some blocks may be performed concurrently.

Also, while FIGS. 6 to 9 illustrate network centric (UE-assisted) methods, it is contemplated that the UE itself is capable of implementing the differential RTT based positioning to determine its own position, if it is provided with the necessary information for UE-based positioning, such as the locations of the base stations. Similarly, the positioning calculation in network-centric scheme could be at a base-station or a core-network entity.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method at a wireless device, comprising:
providing one or more group delay parameters for the wireless device to a positioning entity,
wherein the one or more group delay parameters comprise a round-trip-time (RTT) type parameter indicating whether RTTs reported by the wireless device are measured RTTs or actual RTTs, and
wherein it is determined that a group delay of the wireless device is included in the reported RTTs when the RTT type parameter indicates that the reported RTTs are measured RTTs.

2. The method of claim 1, further comprising:
performing a measurement of a reference signal received from another wireless device.

3. The method of claim 2, further comprising:
providing, to the positioning entity, an indication of which group delay parameter of the one or more group delay parameters applies to the measurement of the reference signal.

4. The method of claim 1, further comprising:
transmitting the one or more group delay parameters to the positioning entity as part of capability information of the wireless device.

5. The method of claim 1, wherein the wireless device comprises a base station.

6. The method of claim 5, wherein the one or more group delay parameters further comprise a group delay difference parameter indicating a difference in group delays among one or more base stations and the base station.

7. The method of claim 6, further comprising:
receiving group delays from the one or more base stations over one or more backhaul links, or
receiving a make and model of each of the one or more base stations over the one or more backhaul links.

8. The method of claim 7, further comprising:
calculating the group delay difference parameter based on the group delays received from the one or more base stations or the make and model of each of the one or more base stations.

9. The method of claim 6, wherein the one or more base stations comprise one or more remote radio heads (RRHs) or transmission-reception points (TRPs) of the base station.

10. The method of claim 1, wherein the one or more group delay parameters further comprise a group delay uncertainty parameter indicating an uncertainty of the group delay of the wireless device.

11. The method of claim 1, wherein the one or more group delay parameters further comprise one or more Tx/Rx configurations, each Tx/Rx configuration corresponding to a Tx/Rx chain through the wireless device, each Tx/Rx configuration comprising link parameters associated with a communication link established between the wireless device and another network node for determining an RTT there between.

12. The method of claim 11, wherein the link parameters comprise one or more of transmit/receive beams, antenna panels, transmission power used, and bandwidth.

13. The method of claim 1, wherein the wireless device comprises a user equipment (UE), a base station, a Transmission and Reception Point (TRP), or a Remote Radio Head (RRH).

14. The method of claim 1, wherein the positioning entity comprises the wireless device, a UE, a base station, a network node, or a location server located in a core network or at a base station.

15. A wireless device, comprising:
at least one transceiver;
at least one memory component; and
at least one processor,
wherein the at least one transceiver, the at least one memory component, and the at least one processor are configured to:
provide one or more group delay parameters for the wireless device to a positioning entity,
wherein the one or more group delay parameters comprise a round-trip-time (RTT) type parameter indicating whether RTTs reported by the wireless device are measured RTTs or actual RTTs, and
wherein it is determined that a group delay of the wireless device is included in the reported RTTs when the RTT type parameter indicates that the reported RTTs are measured RTTs.

16. The wireless device of claim 15, wherein the at least one transceiver, the at least one memory component, and the at least one processor are further configured to:
perform a measurement of a reference signal received from another wireless device.

17. The wireless device of claim 16, wherein the at least one transceiver, the at least one memory component, and the at least one processor are further configured to:
provide, to the positioning entity, an indication of which group delay parameter of the one or more group delay parameters applies to the measurement of the reference signal.

18. The wireless device of claim 15, wherein the at least one transceiver, the at least one memory component, and the at least one processor are further configured to:
transmit the one or more group delay parameters to the positioning entity as part of capability information of the wireless device.

19. The wireless device of claim 15, wherein the wireless device comprises a base station.

20. The wireless device of claim 19, wherein the one or more group delay parameters further comprise a group delay difference parameter indicating a difference in group delays among one or more base stations and the base station.

21. The wireless device of claim 20, wherein the at least one transceiver, the at least one memory component, and the at least one processor are further configured to:
receive group delays from the one or more base stations over one or more backhaul links, or
receive a make and model of each of the one or more base stations over the one or more backhaul links.

22. The wireless device of claim 21, wherein the at least one transceiver, the at least one memory component, and the at least one processor are further configured to:
calculate the group delay difference parameter based on the group delays received from the one or more base stations or the make and model of each of the one or more base stations.

23. The wireless device of claim 20, wherein the one or more base stations comprise one or more remote radio heads (RRHs) or transmission-reception points (TRPs) of the base station.

24. The wireless device of claim 15, wherein the one or more group delay parameters further comprise a group delay uncertainty parameter indicating an uncertainty of the group delay of the wireless device.

25. The wireless device of claim 15, wherein the one or more group delay parameters further comprise one or more Tx/Rx configurations, each Tx/Rx configuration corresponding to a Tx/Rx chain through the wireless device, each Tx/Rx configuration comprising link parameters associated with a communication link established between the wireless device and another network node for determining an RTT there between.

26. The wireless device of claim 25, wherein the link parameters comprise one or more of transmit/receive beams, antenna panels, transmission power used, and bandwidth.

27. The wireless device of claim 15, wherein the wireless device comprises a user equipment (UE), a base station, a Transmission and Reception Point (TRP), or a Remote Radio Head (RRH).

28. The wireless device of claim 15, wherein the positioning entity comprises the wireless device, a UE, a base station, a network node, or a location server located in a core network or at a base station.

29. A non-transitory computer-readable medium storing computer-executable instructions for a wireless device, the computer-executable instructions comprising:
one or more instructions causing the wireless device to provide one or more group delay parameters for the wireless device to a positioning entity,
wherein the one or more group delay parameters comprise a round-trip-time (RTT) type parameter indicating whether RTTs reported by the wireless device are measured RTTs or actual RTTs, and
wherein it is determined that a group delay of the wireless device is included in the reported RTTs when the RTT type parameter indicates that the reported RTTs are measured RTTs.

\* \* \* \* \*